United States Patent
Liu (10) Patent No.: US 6,557,206 B1
(45) Date of Patent: May 6, 2003

(54) VACUUM CLEANER MOUNTING ASSEMBLY

(75) Inventor: Li H. Liu, South Williamsport, PA (US)

(73) Assignee: Shop Vac, Williamsport, PA (US)

( * ) Notice: Subject to any disclaimer, the term of this patent is extended or adjusted under 35 U.S.C. 154(b) by 0 days.

(21) Appl. No.: 09/685,788

(22) Filed: Oct. 10, 2000

(51) Int. Cl.[7] ................................................. A47L 9/00
(52) U.S. Cl. ...................... 15/327.5; 15/323; 248/316.7
(58) Field of Search ............................... 15/327.5, 323; 248/316.7, 309.1

(56) References Cited

U.S. PATENT DOCUMENTS

| | | | | |
|---|---|---|---|---|
| 1,389,984 A | * | 9/1921 | Reed ........................ | 248/316.7 |
| 1,647,039 A | * | 10/1927 | Fischer ..................... | 248/309.1 |
| D159,960 S | | 9/1950 | Davey ........................ | D34/24 |
| 2,555,053 A | * | 5/1951 | Myrick et al. ........... | 248/316.7 |
| 2,595,752 A | | 5/1952 | Batts ........................ | 248/244.8 |
| 2,959,388 A | | 11/1960 | Fogle ........................ | 248/230.9 |
| 2,972,160 A | * | 2/1961 | Hahn .......................... | 15/344 |
| 3,286,446 A | | 11/1966 | Happe et al. ................ | 55/357 |
| 4,763,382 A | | 8/1988 | Sumerau ....................... | 15/323 |
| 4,799,460 A | * | 1/1989 | Kuhl ........................... | 15/344 |
| 4,846,426 A | | 7/1989 | Hannemann et al. ....... | 248/691 |
| 5,035,024 A | * | 7/1991 | Steiner et al. ................ | 15/339 |
| 5,142,730 A | | 9/1992 | Braks et al. ................ | 15/327.5 |
| 5,251,779 A | | 10/1993 | Schmidt .................... | 220/656 |
| 5,480,115 A | * | 1/1996 | Haltof ..................... | 248/309.1 |
| 5,513,416 A | | 5/1996 | Bassler et al. ................ | 15/323 |
| 5,794,303 A | * | 8/1998 | Sanfilippo et al. ............ | 15/344 |
| 6,095,470 A | * | 8/2000 | Kalis ....................... | 248/309.1 |
| 6,189,178 B1 | * | 2/2001 | Roberts ....................... | 15/344 |
| 6,220,557 B1 | * | 4/2001 | Ziaylek et al. ........... | 248/316.1 |

* cited by examiner

Primary Examiner—Theresa T. Snider
(74) Attorney, Agent, or Firm—Marshall, Gerstein & Borun (57) ABSTRACT

A mounting assembly adapted to removably secure a vacuum cleaner to a support includes a mounting rack. The mounting rack has a surface located at its upper end that supports the vacuum cleaner in a suspended state. The mounting assembly also includes a retaining clip connected to the mounting rack. The retaining clip is movable between a first position and a second position. The retaining clip engages an outwardly extending portion of the vacuum cleaner in the first position, and disengages the outwardly extending portion in the second position.

16 Claims, 8 Drawing Sheets

VACUUM CLEANER MOUNTING ASSEMBLY

FIELD OF THE INVENTION

The present invention relates generally to a vacuum cleaner mounting assembly, and more particularly to a mounting assembly for removably securing the vacuum cleaner to a support.

BACKGROUND ART

Mounting assemblies for mounting a vacuum cleaner to a wall are useful because they provide for convenient storage and ready accessibility of the vacuum cleaner, and save floor and shelf space. Various mounting assemblies have been developed that are fastened to or mounted on a support, such as a wall or door. These assemblies typically include a latch fastened to the wall. The latch often resembles a pocket and is adapted to receive a hook located on the vacuum cleaner when the vacuum cleaner is mounted on the latch for hanging storage. These mounting assemblies may not securely retain the vacuum cleaner against movement when it is hung on the wall.

Other mounting assemblies include a wall-mountable holder or container for receiving and securing a vacuum cleaner therein. However, such assemblies are large and cumbersome, and may not be easily or inexpensively manufactured. In addition, the holder typically includes several parts that have to be assembled, thus increasing the complexity and cost of the mounting assembly.

Accordingly, it is desirable that a mounting assembly for mounting a vacuum cleaner to a wall be capable of securely retaining the vacuum cleaner from movement, while allowing the vacuum cleaner to be quickly and easily secured for storage and easily removed for use. In addition, it is desirable to provide a mounting assembly that is one integral piece, thus facilitating manufacturing thereof and reducing cost.

SUMMARY OF THE INVENTION

In accordance with one aspect of the present invention, a mounting assembly adapted to removably secure a vacuum cleaner to a support is provided. The mounting assembly includes a mounting rack that has a surface located at its upper end that supports the vacuum cleaner in a suspended state. The mounting assembly further includes a retaining clip connected to the mounting rack, and movable between a first position and a second position. The retaining clip engages an outwardly extending portion of the vacuum cleaner in the first position, and disengages the outwardly extending portion in the second position.

The retaining clip may have a lever connected to the mounting rack, and a locking portion connected at a free end of the lever. The locking portion may be angled relative to the surface of the mounting rack. The retaining clip may be pivotally connected to the mounting rack in which the retaining clip automatically pivots from the first position toward the second position when the vacuum cleaner is placed on the mounting rack. In addition, the retaining clip may be spring loaded to move from the second position to the first position after the vacuum cleaner is fully seated on the mounting rack.

The mounting rack may have a base portion, where the base portion has a generally curved shape that is complementary to a portion of the vacuum cleaner. In addition, the mounting rack may have generally parallel sides. The retaining clip may be connected at one side of the mounting rack, and extends upwardly past the surface of the mounting rack.

In accordance with another aspect of the present invention, a vacuum cleaner and mounting assembly for mounting the vacuum cleaner is provided. The vacuum cleaner has a tank and the tank has a hook extending outwardly about an outer periphery of the tank. A mounting rack is secured to a wall and has generally parallel sides and a surface located at its upper end that supports the vacuum cleaner in a suspended state. The mounting rack has a base having a generally curved shape that is complementary to the tank of the vacuum cleaner. A retaining clip is further provided. The retaining clip has a lever and a locking portion. The lever is pivotably connected at one side of the mounting rack, and the locking portion is located at a free end of the lever. The locking portion is angled relative to the surface of the mounting rack. The retaining clip automatically pivots between a first position in which the retaining clip engages the hook of the vacuum cleaner, and a second position in which the retaining clip disengages the hook of the vacuum cleaner.

Other features and advantages are inherent in the vacuum cleaner and storage device claimed and disclosed, or will become apparent to those skilled in the art from the following detailed description in conjunction with the accompanying drawings.

DETAILED DESCRIPTION OF THE PREFERRED EMBODIMENT

Throughout the specification and drawings, like reference numerals refer to like components or parts. With reference to FIGS. 1–8, the present invention provides a mounting assembly 200 for removably securing a vacuum cleaner 100 to a support 500.

Figure 1:
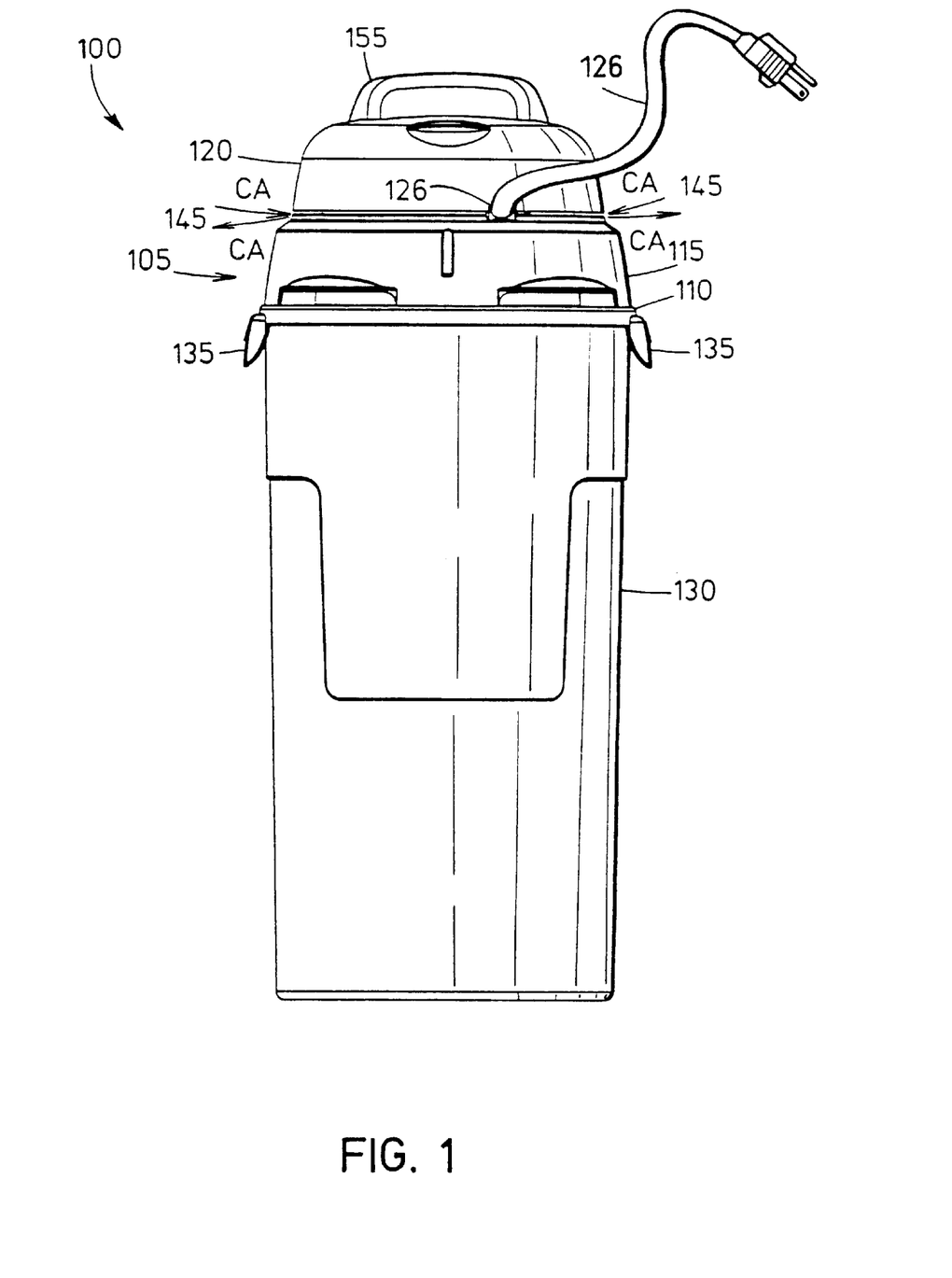
FIG. 1 is a side elevational view of a vacuum cleaner suitable for use with the present invention.

With particular reference to FIG. 1, an illustration of a tank-type vacuum cleaner, indicated generally at 100, is shown. The vacuum cleaner 100 includes a tank 130, and a removable vacuum assembly, indicated generally at 105. The removable vacuum assembly 105 includes a lid 110, an upper housing 115, a motor cover 120, and a handle 155. The lid 110 is disposed above the tank 130, and may be removably attached to the tank 130 by one or more latches 135 which are carried by the lid 110. The upper housing 115 is disposed above the lid 110 and is connected to the lid 110. The upper housing 115 contains a motor/air impeller assembly (not shown) which may be of conventional construction.

The cover 120 is disposed above the upper housing 115 and is connected to the upper housing 115. The upper housing 115 and the cover 120 may be formed as two, separate, detachable pieces or as one piece, integral with one another. The cover 120 includes an electric cord 126 for providing power to the vacuum cleaner 100.

The upper housing 115 and the cover 120 further define a cooling air opening 145. The cooling air opening 145 allows air to enter and exit under the cover 120, as shown by the arrows CA in FIG. 1. The air entering and exiting under the cover 120 circulates under the cover and cools the motor assembly disposed within the upper housing 115.

The handle 155 is disposed above the cover 120 and is connected to the cover 120. The handle 155 may be used to assist a user in lifting and moving the vacuum cleaner 100. For illustrative purposes, the handle 155 is shown connected to the cover 120 of the vacuum cleaner 100. However, the handle 155 may be located at many locations on the vacuum cleaner 100.

The motor of the vacuum cleaner 100 is typically powered by an AC power source which also drives the air impeller to generate air flow through the vacuum cleaner 100. The air flow draws air and other material into an inlet (not shown) of the vacuum cleaner 100. Tank-type vacuum cleaners 100 are capable of receiving dry materials such as debris or dirt, and may also be used for suctioning liquids. The suctioned materials are collected in the tank 130 of the vacuum cleaner 100.

While the description herein refers to a tank-type vacuum cleaner 100, such as a wet/dry vacuum cleaner 100 sold by Shop Vac Corporation of Williamsport, Pa., other types of vacuum cleaners 100 may be substituted without departing from the spirit of the invention. For example, miniature, cordless, upright, dry-only, AC or DC powered vacuum cleaners may be utilized with the present invention.

Figure 2:
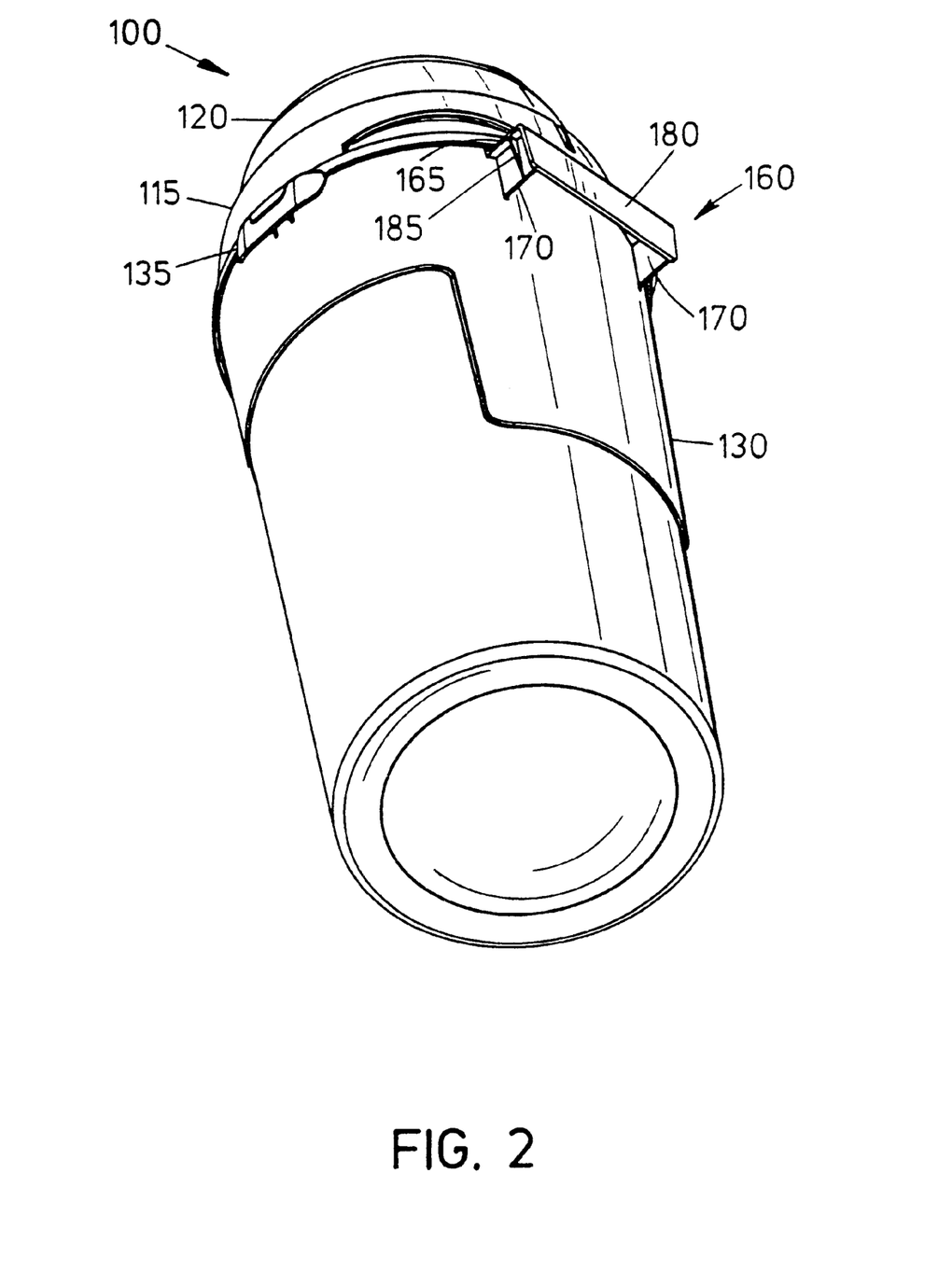
FIG. 2 is a perspective view of the vacuum cleaner showing a hook located on the vacuum cleaner.

With reference to FIG. 2, the vacuum cleaner 100 is provided with an outwardly extending portion, preferably a hook, indicated generally at 160. The hook 160 is located at an upper end of the vacuum cleaner 100. The hook 160 is defined by a top wall 165 extending outwardly about the periphery of the vacuum cleaner 100, and a pair of sidewalls 170 extending downwardly from the top wall 165. A connecting wall 180 extends inwardly from each sidewall 170. The hook 160 further includes a wedge 185 located at one of the sidewalls 170.

Figure 3:
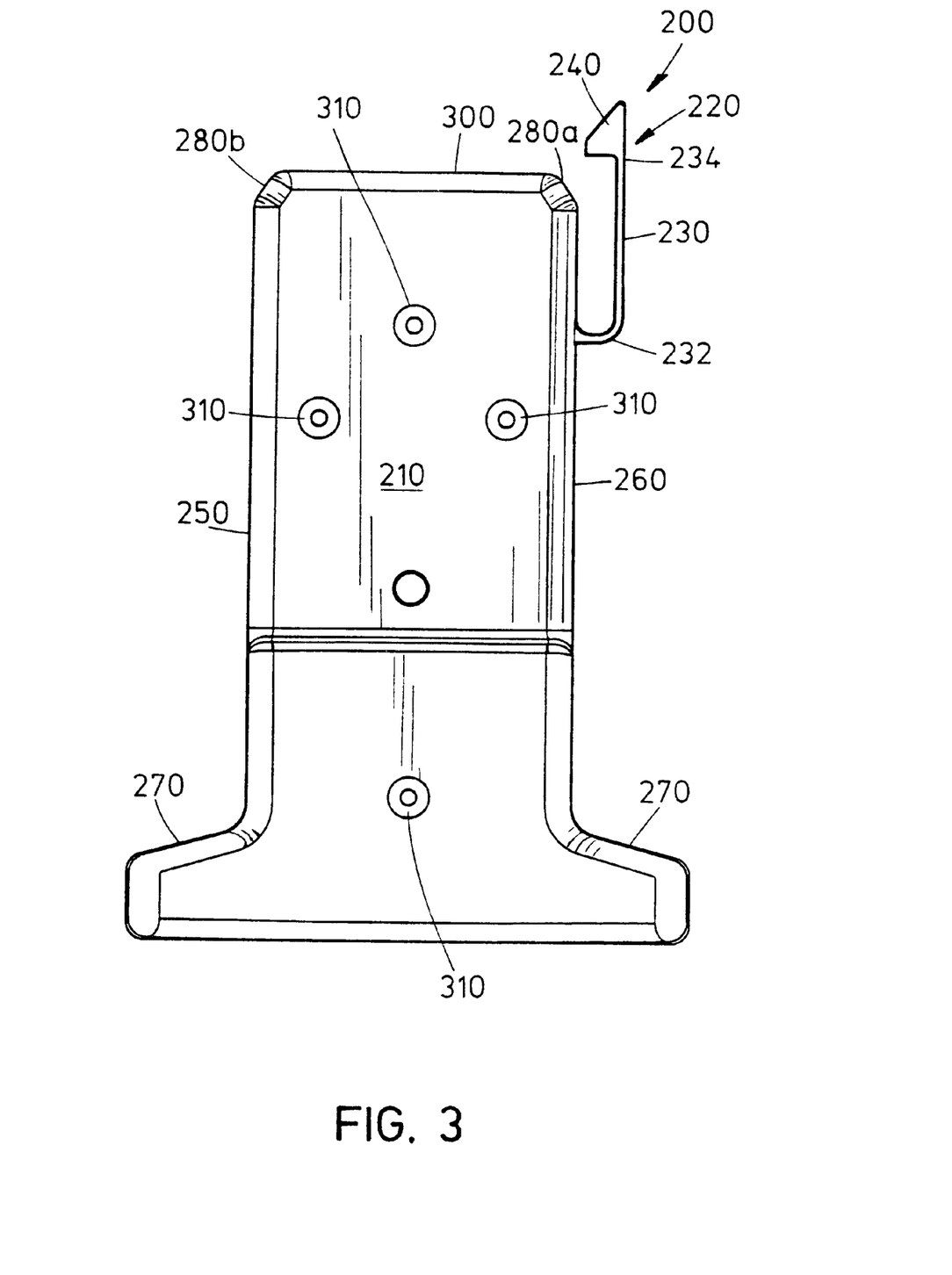
FIG. 3 is a front plan view of the mounting assembly of the present invention.
Figure 4:
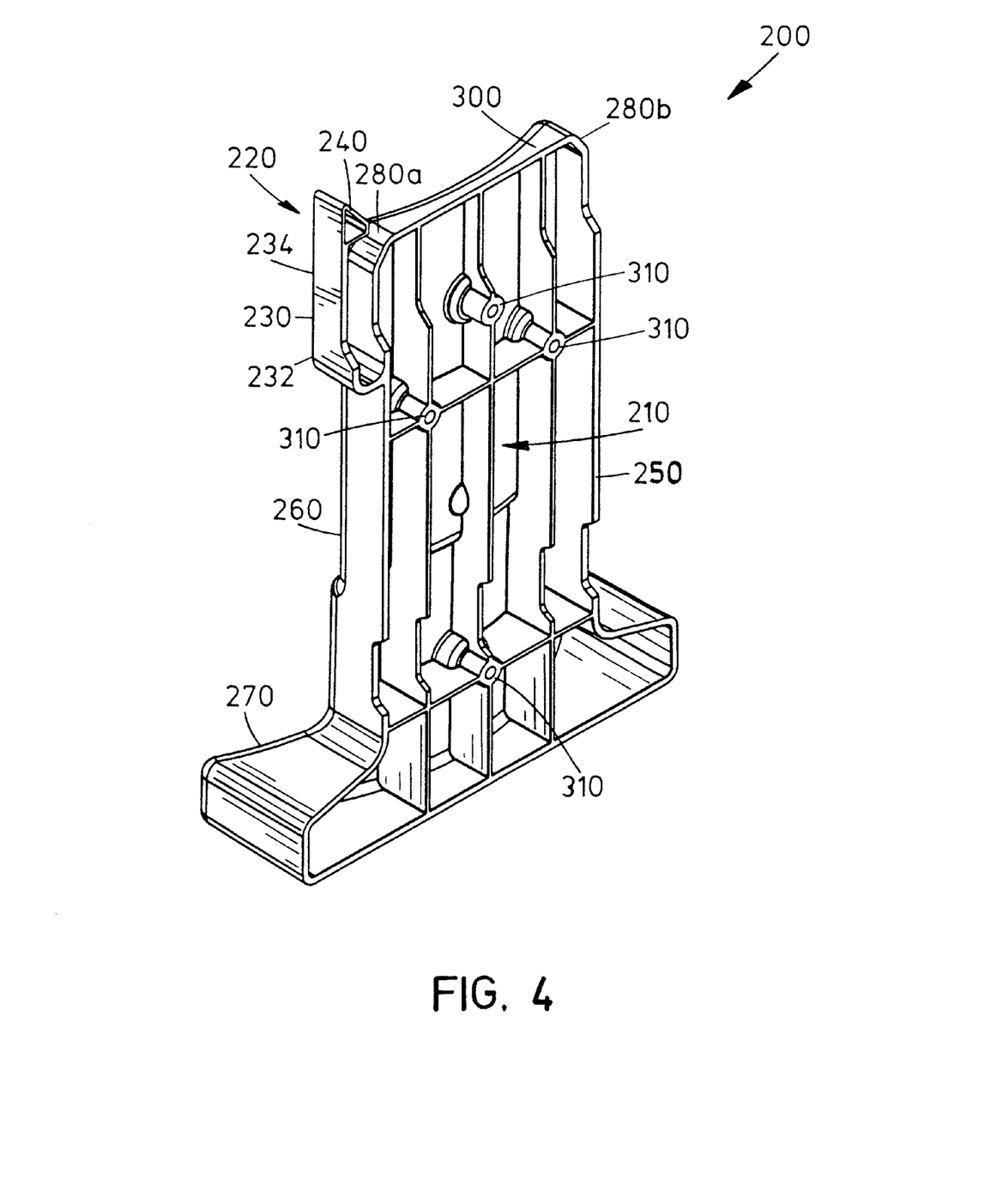
FIG. 4 is a rear perspective view of the mounting assembly of the present invention.
Figure 5:
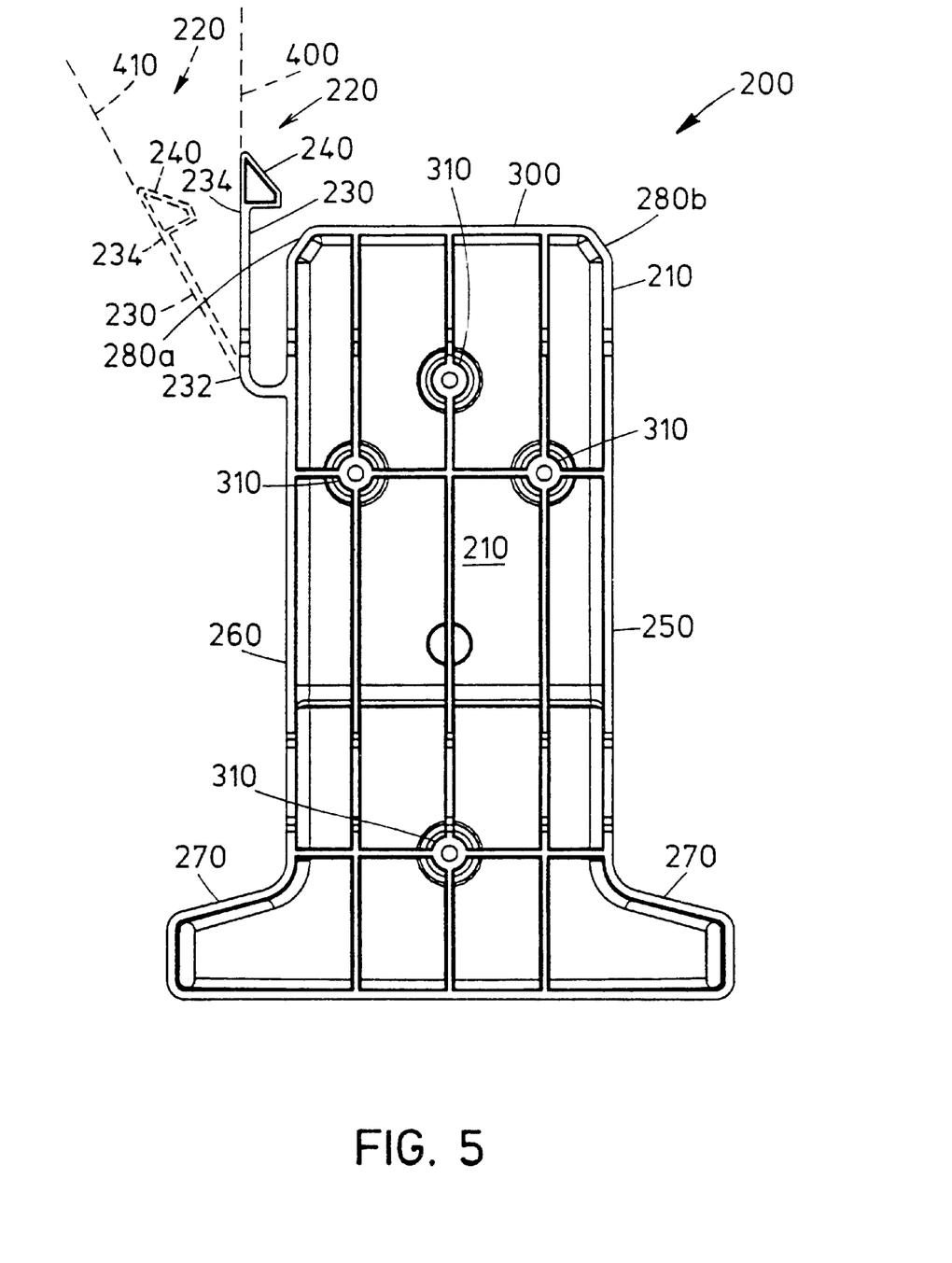
FIG. 5 is a rear plan view of the mounting assembly of the present invention showing a retaining clip being movable between a first position and a second position.

Referring to FIGS. 3–5, a mounting assembly, indicated generally at 200, is shown. The mounting assembly 200 includes a mounting rack 210. The mounting rack 210 has a generally horizontal surface 300 located at an upper end of the mounting rack 210. The surface 300 is adapted to support the vacuum cleaner 100 in a suspended state when the vacuum cleaner 100 is seated on the mounting rack 210.

The mounting rack 210 has generally parallel sides 250, 260, and a base portion 270. The base portion 270 has a generally curved shape that is complementary with a portion of the vacuum cleaner 100, e.g., the tank 130.

The mounting rack 210 further includes edge portions 280a, 280b located at each of the sides 250, 260 of the mounting rack 210. The edge portions 280a, 280b are angled relative to the surface 300 of the mounting rack 210. In this manner, the mounting rack 210 is adapted for easy engagement with the hook 160 of the vacuum cleaner 100, thus facilitating placement on and removal from the mounting rack 210.

A retaining clip, indicated generally at 220, is pivotably connected to the mounting rack 210 at one side 260 of the mounting rack 210. In the preferred embodiment, the retaining clip 220 is connected at the upper end of the mounting rack 210, and extends upwardly past the surface 300 of the mounting rack 210. Although the retaining clip 220 is shown connected to side 260 of the mounting rack 210, the retaining clip 220 may be connected to side 250 of the mounting rack 210 without deviating from the present invention.

The retaining clip 220 includes a lever 230. The lever 230 is connected to the mounting rack 210 at end 232 of the lever 230, and a locking portion 240 is connected to the lever 230 at free end 234 of the lever 230. Preferably, the locking portion 240 is angled relative to the surface 300 of the mounting rack 210.

With particular reference to FIG. 5, the retaining clip 220 is movable between a first position defined by axis 400, and a second position defined by axis 410. The retaining clip 220 is normally biased in the first position 400. When the vacuum cleaner 100 is placed on the mounting rack 210, the retaining clip 220 automatically pivots from the first position 400 toward the second position 410 to allow for placement of the vacuum cleaner 100 on the mounting rack 210. The angle of the locking portion 240 facilitates automatic movement of the clip from the first position toward the second position when the vacuum cleaner 100 is placed on the mounting rack 210. Similarly, the retaining clip 220 may pivot from the first position 400 to any position between the first position 400 and the second position 410. After the vacuum cleaner 100 is seated on the mounting rack 210, the retaining clip 220 is spring loaded to automatically move from the second position 410 (or any position between the first position 400 and the second position 410) back toward the first position 400.

Figure 6:
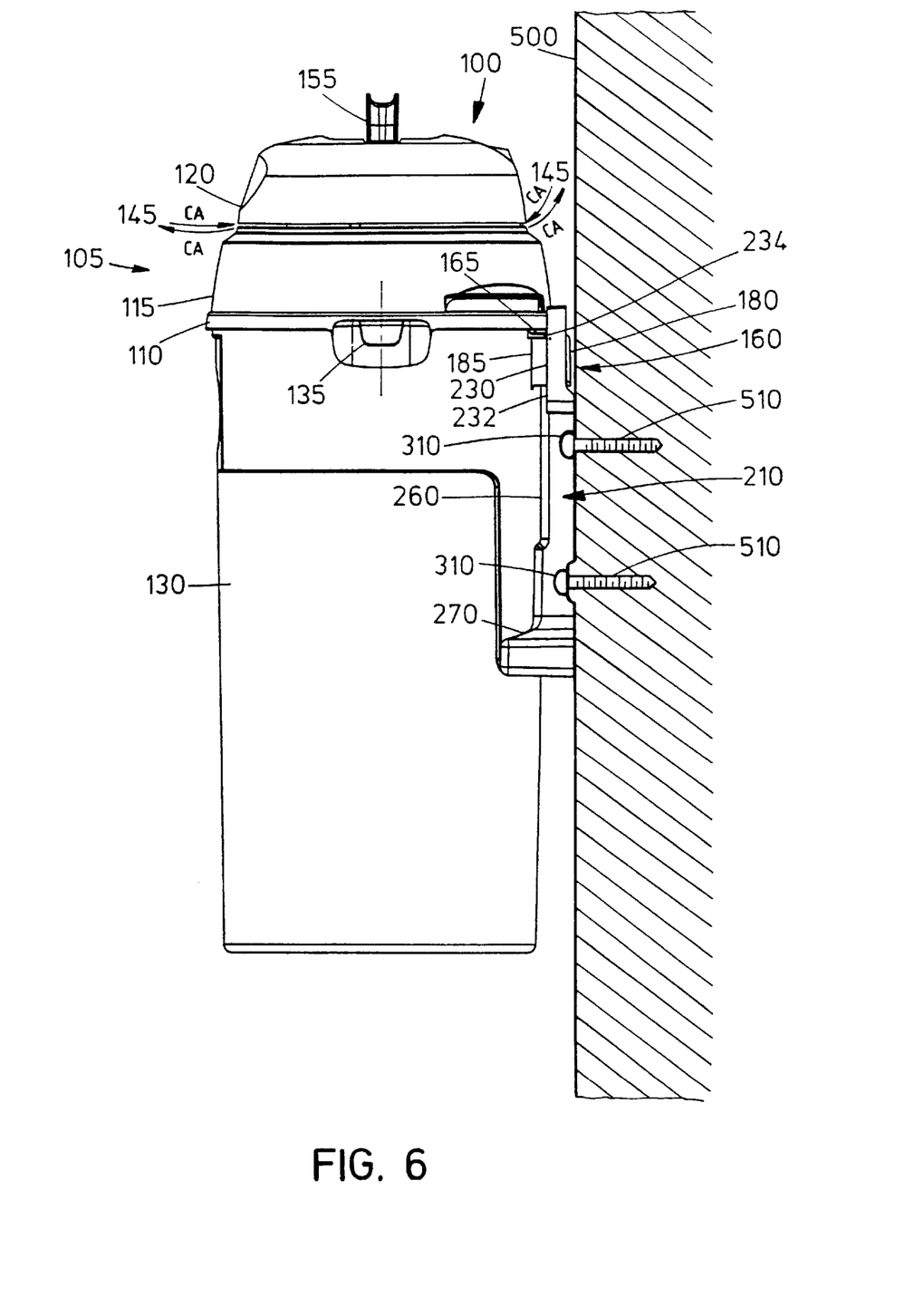
FIG. 6 is a side-elevational view showing the vacuum cleaner secured to a support utilizing the mounting assembly of the present invention.
Figure 7:
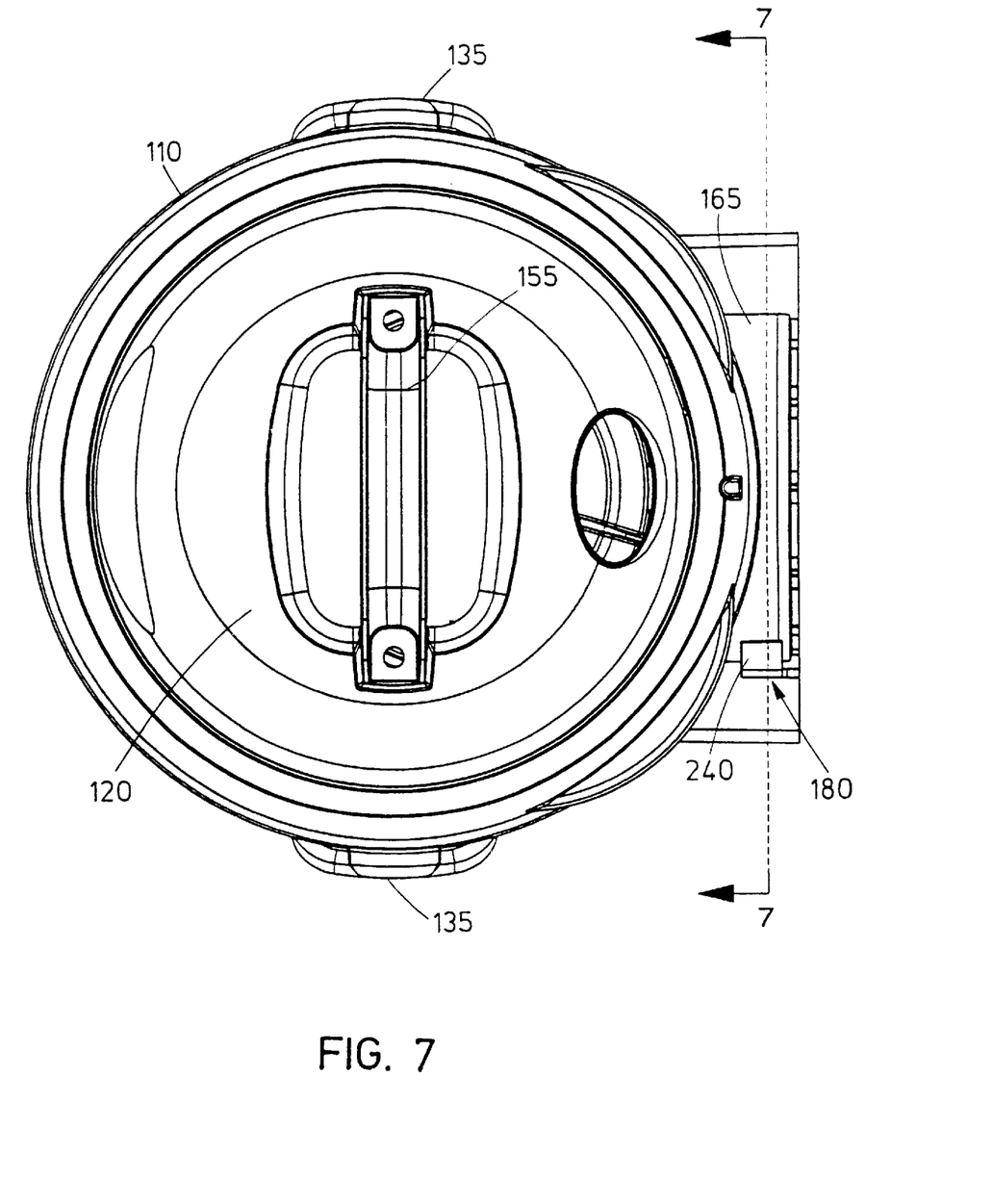
FIG. 7 is a top plan view showing the vacuum cleaner mounted on the mounting rack.
Figure 8:
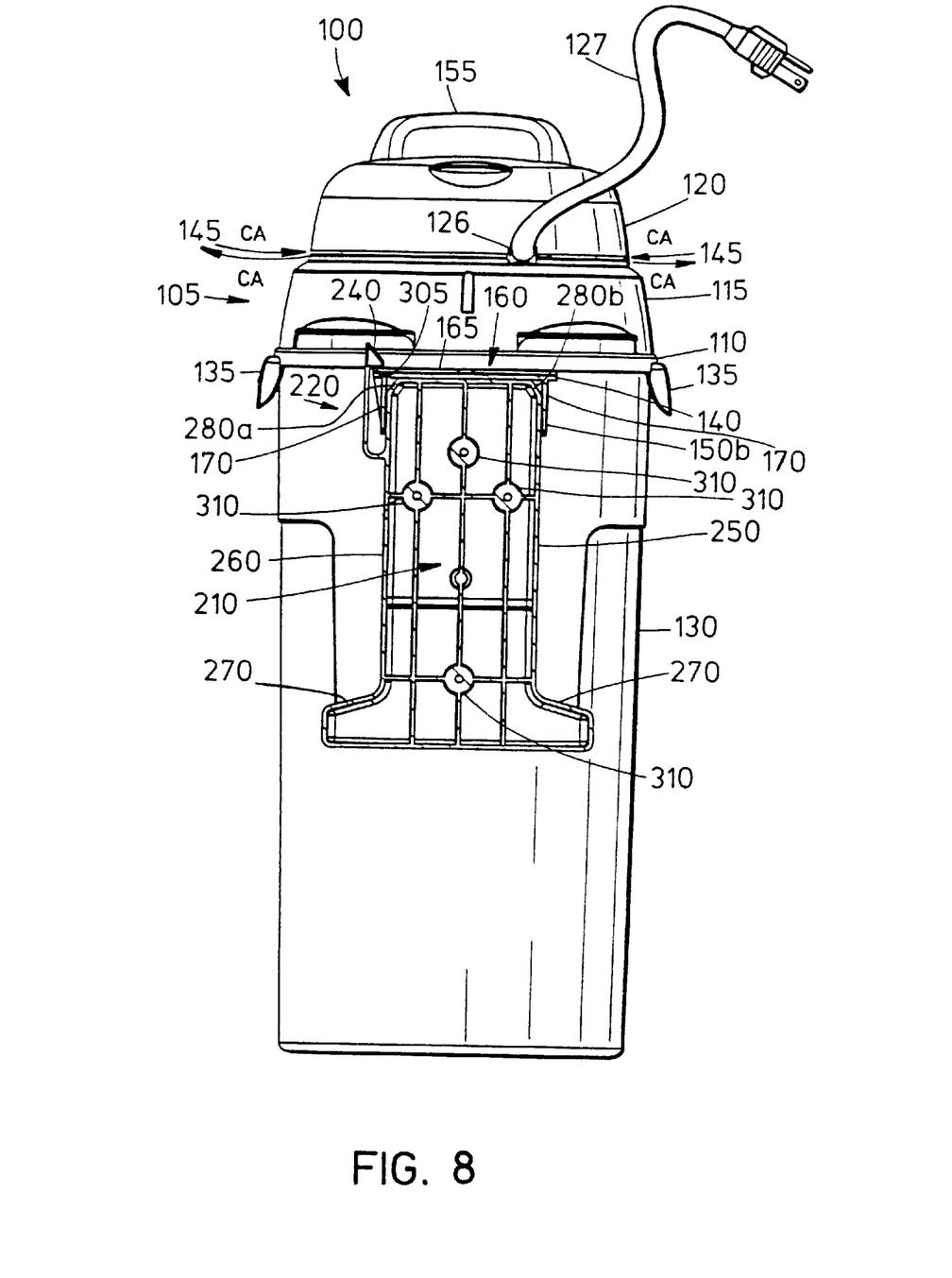
FIG. 8 is a sectional view taken along line 7—7 in FIG. 7.

With reference to FIGS. 6–8, operation of the mounting assembly 200 for removably securing the vacuum cleaner 100 to the support 500 is now discussed. As shown in FIG. 6, the mounting rack 210 includes one or more holes 310 formed therein. The holes 310 are adapted to receive a number of mounting screws 510 to secure the mounting rack 210 to the support 500, such as a wall, a door, or other similar support. When the vacuum cleaner 100 is seated on the mounting rack 210, the base portion 270 of the mounting rack 210 matingly engages the curved tank 130 of the vacuum cleaner 100.

Referring to FIGS. 7–8, when the vacuum cleaner 100 is seated on the mounting rack 210, the hook 160 of the vacuum cleaner 100 is supported on the surface 300 of the mounting rack 210, and the bottom 305 of the locking portion 240 of the retaining clip 220 engages the top wall 165 of the hook 160. In this manner, the vacuum cleaner 100 is secured to the mounting rack 210, thus preventing movement of the vacuum cleaner 100.

To remove the vacuum cleaner 100 from the mounting rack 210, the retaining clip 220 is manually moved from the first position 400 toward the second position 410, and the vacuum cleaner 100 is lifted from the surface 300 of the mounting rack 210. In this manner, the retaining clip 220 disengages the hook 160 of the vacuum cleaner 100, thus allowing the vacuum cleaner 100 to be moved.

Although the surface 300 of the mounting rack 210 and the retaining clip 220 are described as being located at the upper end of the mounting rack 210, the surface 300 and retaining clip 220 may be located at a mid to lower end of the mounting rack 210 dependent upon the location of the hook 160 of the vacuum cleaner 100.

The foregoing detailed description has been given for clearness of understanding only, and no unnecessary limitations should be understood therefrom, as modifications would be obvious to those skilled in the art.

What is claimed is:

1. A vacuum cleaner and mounting assembly for mounting the vacuum cleaner, comprising:
   a vacuum cleaner having a tank, wherein the tank includes a hook extending outwardly about an outer periphery of the tank;
   a mounting rack secured to a wall, the mounting rack having generally parallel sides and a surface located at an upper end of the mounting rack, wherein the surface supports the vacuum cleaner in a suspended state, the mounting rack further including a base having a generally curved shape that is complementary to the tank of the vacuum cleaner; and
   a retaining clip having a lever and a locking portion, wherein the lever is pivotably connected at one side of the mounting rack and the locking portion is located at a free end of the lever, the locking portion being angled relative to the surface of the mounting rack, wherein the retaining clip is adapted to automatically pivot between a first position in which the retaining clip is adapted to engage the hook of the vacuum cleaner, and a second position in which the retaining clip is adapted to disengage the hook of the vacuum cleaner.

2. A vacuum cleaner and mounting assembly for mounting the vacuum cleaner, comprising:
   a vacuum cleaner including an outwardly extending portion;
   a mounting rack having a surface located at an upper end of the mounting rack, the surface being adapted to engage and support the vacuum cleaner in a suspended state; and
   a retaining clip connected to the mounting rack, wherein the retaining clip is movable between a first position and a second position, the retaining clip engages the outwardly extending portion of the vacuum cleaner in the first position, and the retaining clip disengages the outwardly extending portion in the second position.

3. The vacuum cleaner, as set forth in claim 2, wherein the retaining clip is pivotably connected to the mounting rack, the retaining clip automatically pivots from the first position toward the second position when the vacuum cleaner is placed on the mounting rack.

4. The vacuum cleaner, as set forth in claim 2, wherein the outwardly extending portion of the vacuum cleaner includes a hook defined by a top wall extending outwardly about the periphery of the vacuum cleaner, a pair of sidewalls extending downwardly from the top wall, and a connecting wall extending inwardly from each sidewall.

5. The mounting assembly, as set forth in claim 2, wherein the outwardly extending portion of the vacuum cleaner includes a hook.

6. The mounting assembly, as set forth in claim 5, wherein the hook includes a top wall extending outwardly about the periphery of the vacuum cleaner, a pair of sidewalls extending downwardly from the top wall, and a connecting wall extending inwardly from each sidewall.

7. The mounting assembly as set forth in claim 2, wherein the retaining clip includes a lever connected to the mounting rack and a locking portion located at a free end of the lever, wherein the locking portion is angled relative to the surface of the mounting rack.

8. The mounting assembly as set forth in claim 2, wherein the retaining clip is pivotably connected to the mounting rack.

9. The mounting assembly as set forth in claim 2, wherein the retaining clip is spring loaded to move the retaining clip from the second position to the first position after the vacuum cleaner is fully seated on the mounting rack.

10. The mounting assembly as set forth in claim 2, wherein the mounting rack includes generally parallel sides.

11. The mounting assembly, as set forth in claim 10, wherein the retaining clip is connected at one side of the mounting rack.

12. The mounting assembly as set forth in claim 10, wherein the mounting rack includes edge portions located at each of the sides of the mounting rack, the edge portions being angled relative to the surface of the mounting rack.

13. The mounting assembly as set forth in claim 2, wherein the retaining clip extends upwardly past the surface of the mounting rack.

14. The mounting assembly as set forth in claim 2, wherein the mounting rack includes a base portion having a generally curved shape that is complementary to a portion of the vacuum cleaner.

15. The mounting assembly as set forth in claim 2, wherein the mounting rack includes a hole adapted to receive a mounting screw.

16. The mounting assembly as set forth in claim 2, wherein:
   the mounting rack includes a hole and a mounting screw;
   the hole is adapted to receive the mounting screw; and
   the mounting screw is adapted to secure the mounting rack to the support.

* * * * *